United States Patent
Banasky, Jr.

(10) Patent No.: US 9,379,828 B2
(45) Date of Patent: Jun. 28, 2016

(54) MULTIPLE TRANSCEIVER AND ANTENNA VERIFICATION SYSTEM

(71) Applicant: Ford Global Technologies, LLC, Dearborn, MI (US)

(72) Inventor: Lawrence Banasky, Jr., Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/535,618

(22) Filed: Nov. 7, 2014

(65) Prior Publication Data

US 2016/0134383 A1    May 12, 2016

(51) Int. Cl.
*H04B 17/00* (2015.01)
*H04W 24/00* (2009.01)
*H04B 17/318* (2015.01)

(52) U.S. Cl.
CPC .................................. *H04B 17/318* (2015.01)

(58) Field of Classification Search
CPC ..... H04W 24/02; H04W 24/04; H04W 24/06; H04B 17/0085; H04B 17/102; H04B 17/15; H04B 17/29; H04B 17/318
USPC ............................................. 455/67.14, 423
See application file for complete search history.

(56) References Cited

U.S. PATENT DOCUMENTS

| | | | |
|---|---|---|---|
| 8,774,012 B2 | 7/2014 | Sakamoto et al. | |
| 2009/0309753 A1* | 12/2009 | Ghabra | H04B 17/318 340/686.2 |
| 2013/0090068 A1 | 4/2013 | Naruse et al. | |
| 2013/0136007 A1 | 5/2013 | Jiang et al. | |
| 2014/0329470 A1* | 11/2014 | Chen | H04B 17/0085 455/67.7 |
| 2014/0349585 A1* | 11/2014 | Aydin | H04W 24/06 455/67.14 |
| 2015/0003261 A1* | 1/2015 | Silverman | H04B 7/0456 370/252 |
| 2015/0126132 A1* | 5/2015 | Chung | H04B 1/3827 455/67.14 |

FOREIGN PATENT DOCUMENTS

| | | |
|---|---|---|
| JP | 4536605 B2 | 9/2010 |
| JP | 2012004759 A | 1/2012 |

* cited by examiner

*Primary Examiner* — Simon Nguyen
(74) *Attorney, Agent, or Firm* — Frank A. MacKenzie; Bejin Bieneman PLC (57) ABSTRACT

A system includes a control unit and multiple transceivers connected by a communication bus. The transceivers are respectively connected to antennas. The control unit tests the operation of the transceivers by transmitting a test signal from a first transceiver to a second transceiver, receiving a return signal based on the test signal from the second transceiver, and determining if the strength of the return signal is within a predetermined range.

20 Claims, 4 Drawing Sheets

MULTIPLE TRANSCEIVER AND ANTENNA VERIFICATION SYSTEM

BACKGROUND

Vehicle to Vehicle and Vehicle to Infrastructure (collectively, V2X) short range communication systems may be provided for various functions in vehicles, including advanced safety and other critical features in modern vehicles. As vehicles, along with installed V2X systems, age, the risk for failure of these systems increases. Presently, testing or verification mechanisms for V2X systems are lacking that can be conveniently performed on a regular basis without additional external test hardware.

DESCRIPTION

Introduction

Figure 1:
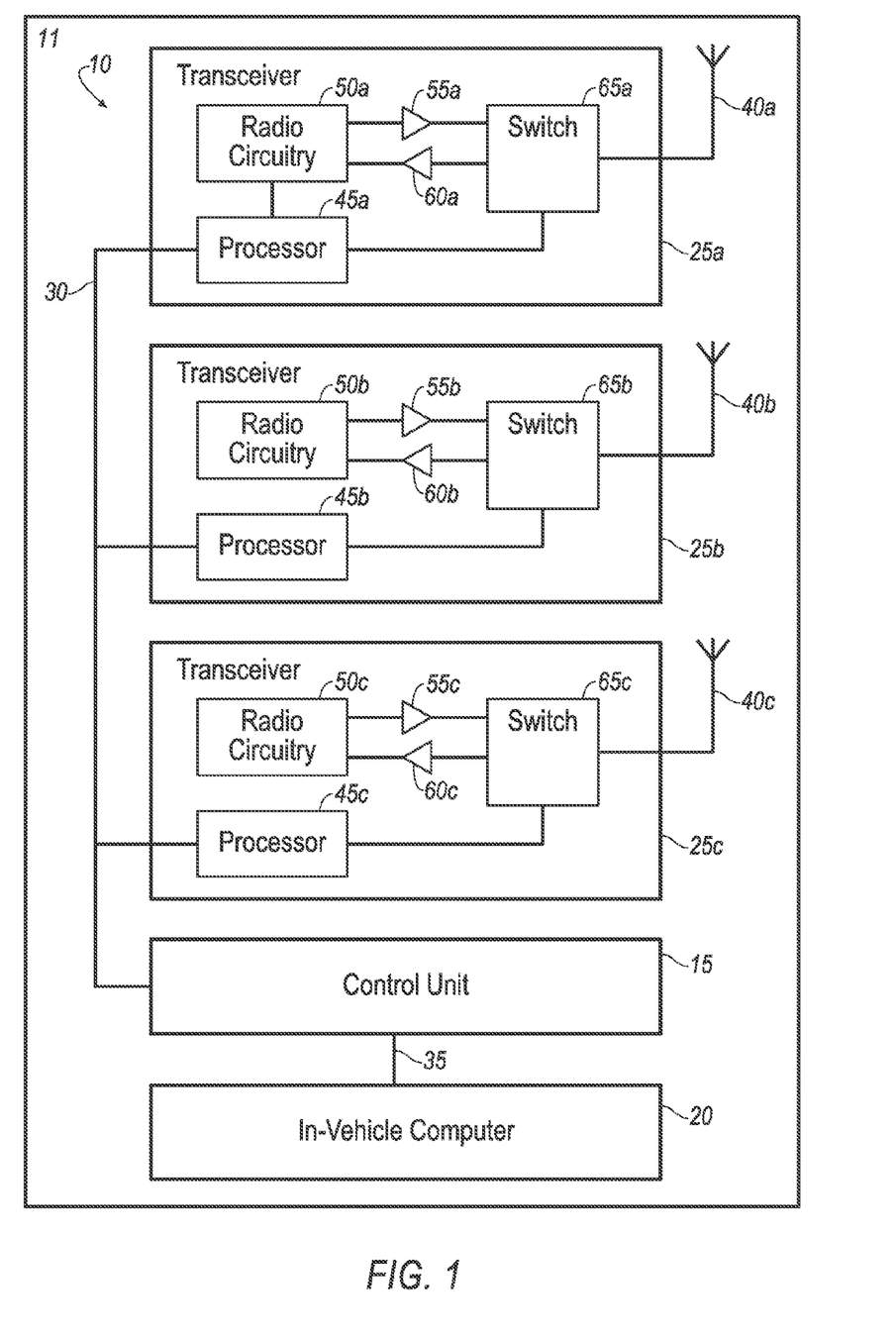
FIG. 1 is block diagram of a transceiver testing system.

FIG. 1 is a block diagram of an exemplary system 10 for testing multiple radio frequency transceivers 25 within a vehicle 11 used for vehicle to vehicle (V2V) and vehicle to infrastructure (V2I) communications (collectively, V2X). The system 10 includes a control unit 15 which is in communication with the transceivers 25, for example, via a first vehicle communication bus 30. The control unit 15 may further be in communication with the vehicle 11, for example, with an in-vehicle computer 20 via a second vehicle communication bus 35. In response to data received from the in-vehicle computer 20, and/or based on other criteria, for example, elapsed time since a previous test, the control unit 15 may initiate testing of the multiple transceivers 25.

Testing includes initiating and monitoring radio frequency (RF) transmissions between the multiple transceivers 25. Testing the transceivers, as used herein, refers to verifying the operation of the transceivers, by performing transmit and receive operations and monitoring the results. For example, the control unit 15 may instruct a first transceiver 25a to transmit a test signal at a given strength and configure a second transceiver 25b to receive a return signal, derived from the test signal. The control unit 15 may determine, based on characteristics of the return signal, if the transmission path from the first transceiver 25a to the second transceiver 25b is operational.

For example, the strength of the return signal as measured by the second transceiver 25b may be compared to a predetermined range to determine if the transmission from the first transceiver 25a to the second transceiver 25b is successful, and to obtain an indication of an operational status of the first and second transceivers 25a, 25b. As another example, the transmitted test signal may include a digital test code. Confirming the presence of the digital test code in the return signal may be an indication of a successful test transmission.

Moreover, through test transmissions between different pairs of the multiple transceivers 25, more detailed conclusions may be drawn regarding the operational status of each of the multiple transceivers 25. For example, a test may be conducted in which the first transceiver 25a successfully transmits a test signal to the second transceiver 25b, but unsuccessfully transmits a test signal to a third transceiver 25c. Based on these results, the system 10 could determine that the first transmitter 25a is operational in transmit mode, the second transmitter 25b is operational in receive mode, and the third transceiver 25c is non-operational in receive mode.

Testing the transceivers 25 may be initiating upon the control unit 15 detecting an event and/or a status of a vehicle 11 component, e.g., according to standard messages available via the busses 30, 35, e.g., via controller area network (CAN) communications, OBD (on-board diagnostics), or the like. For example, the control unit 15 may receive status information of the vehicle 11 from the in-vehicle computer 20. The status information may indicate, for example, that the vehicle 11 is being started, running, or being turned off. Based on this information, and possibly also other factors, such as, for example, the elapsed time since the last test, availability of transceivers 25 for testing, etc., the control unit 15 may initiate testing of the transceivers 25. If it is determined that one or more of the transceivers 25 is non-operational, the system 10 may provide notice to a driver, by, for example, showing a warning symbol on a dashboard display. In this manner, a V2X system malfunction can be identified and indicated.

In some cases, the system 10 may repurpose an operational transceiver 25 to assume some or all of the responsibilities of a non-operational transceiver 25. For example, in the system 10, the first transceiver 25a may be responsible for critical, safety functions, and the second transceiver 25b may be responsible for non-critical functions. The system 10 may determine that the first transceiver 25a is non-operational, and the second transceiver 25b is operational. Based on this determination, the system 10 may repurpose the second transceiver 25b to assume the responsibility for the critical safety functions originally handled by the first transceiver 25a, thereby increasing the safety of the vehicle.

System Elements

The vehicle 11 is generally a land-based vehicle having two or more wheels, e.g., a motorcycle, a passenger car, light truck, etc. equipped with V2X communication capability. As described in detail below, the vehicle 11 may include one or more in-vehicle computers 20 which may be coupled via one or more vehicle communication buses, for example the vehicle communication bus 35.

The control unit 15 generally includes a processor and a memory, the memory including one or more forms of computer-readable media, and storing instructions executable by the processor for performing various operations, including as disclosed herein. The memory of the control unit 15 further generally stores data collected from a vehicle 11, for example, from the in-vehicle computer 20. The control unit 15 is configured for communications, for example, on first and second vehicle communication busses 30, 35.

The first and second communication busses 30, 35 may be controller area network (CAN) buses or the like, and/or other wire or wireless protocols, e.g., Bluetooth, etc. The control unit 15 may also have a connection to an onboard diagnostics connector (OBD-II), e.g., according to the J1962 standard. Via the CAN buses, OBD-II connector port, and/or other wired or wireless mechanisms, the control unit 15 may transmit and receive messages to the multiple transceivers 25, and the in-vehicle computer 20. The control unit 15 is programmed to execute testing of the multiple transceivers 25 of the system 10, as described in detail below.

The in-vehicle computer 20 also generally includes a processor and a memory, the memory including one or more forms of computer-readable media, and storing instructions executable by the processor for performing various operations, including as disclosed herein. The memory of the in-vehicle computer 20 further generally stores data collected from the vehicle 11 controllers, sensors, etc. For example, the in-vehicle computer 20 may collect data related to vehicle operation status, such as vehicle start, vehicle running, vehicle turning off, vehicle off, etc. It may further include information such as vehicle location based on GPS data. The in-vehicle computer 20 may communicate with the control unit 15 via the second vehicle bus 35, which as described above may be a CAN bus or the like, and/or other wire or wireless protocol such as Bluetooth, etc. Although one in-vehicle computer 20 is illustrated for convenience, as described above, the in-vehicle computer 20 may include one or more computing devices, controllers, etc. that provide data via one or more communication buses, e.g., communication bus 35.

Communication bus configurations other than presently illustrated are possible. For example, the transceivers 25, the control unit 15, and the one or more in-vehicle computers 20 may share the first vehicle bus 30. Accordingly, operations performed by the one or more in-vehicle computers 20 or performed by the control unit 15 could be distributed over multiple processors or computers.

Each of the transceivers 25 generally includes a processor 45, radio circuitry 50, an output amplifier 55, an input pre-amplifier 60 and a switch 65 to toggle the transceiver between transmit mode and receive mode. Each of the transceivers 25 may include and/or be connected respectively to a dedicated antenna 40. The transceivers 25 support RF (radio frequency) V2X short range communication systems. In the United States, these communications typically take place in an unlicensed portion of the 5.9 GHz waveband set aside for WiFi applications. Using V2X communication, vehicles travelling in proximity to each other may communicate vehicle-based data regarding speed, location, direction of travel, type of vehicle, etc. An example of a commercially available V2X transceiver is the Pluton-ATK3100 V2X RF Transceiver from Autotalks Ltd., of Kfar-Netter, Israel.

The transceiver 25 processor 45 selectively communicates with the control unit 15 via the first vehicle communication bus 30. The processor 45 further provides instructions for the radio circuitry 50 and switch 65 of the transceiver 25, e.g., via wired internal connections or the like. For example, based on a communication received from the control unit 15, the processor 45 may toggle the switch 65 to a transmit mode from a receive mode or a standby mode, select a transmit frequency or a receive frequency for the radio circuitry 50, provide data to the radio circuitry 50, and/or activate a transmission of the data by the radio circuitry 50. The processor 45 may also receive diagnostic data from the radio circuitry 50, such as a determined strength of a return signal.

The radio circuitry 50 may convert data received from the processor 45 from digital data to an RF signal for radio transmission in the transmit mode and output the RF signal to the output amplifier 55. The radio circuitry 50 may further receive an RF signal from the pre-amplifier 60, determine a strength of the return signal, extract digital information from the return signal, and provide data representing characteristics of the return signal to the controller 45 in the receive mode.

The output amplifier 55 may increase a power level of the RF signal generated by the radio circuitry 50 to a level sufficient for the RF signal to be transmitted via the antenna 40, to another transceiver 25. The other transceiver may, for example, be located on the same vehicle 11, on a second vehicle, or on a stationary tower as part of a communication infrastructure.

The input pre-amplifier 60 may increase the power level of an RF return signal received via the antenna 40 from another transceiver, to a level which can be communicated reliably to the radio circuitry 50 for decoding. The pre-amplifier 60 may also perform filtering functions on the RF return signal.

An antenna 40 adapted to V2X communication systems may be included and/or connected to each transceiver 25. An example of a commercially available V2X antenna for mobile applications is the RM3-5500 antenna from Mobile Mark, Inc., of Itasca, Ill., USA. Although shown for convenience as a single antenna 40, the antenna 40 may be one or more antennas 40. In addition, the antenna 40 may be located away from the respective transceiver 25, and/or may be included in a printed circuit board together with the respective transceiver 25. The antenna 40 may receive an RF transmission from another in-vehicle transceiver 25, or from a transceiver or transmitter outside of the vehicle 11. For example, the other transceiver may be mounted on another vehicle or on a tower. Based on the received RF signal, the antenna may provide a return signal to the pre-amplifier 60.

Exemplary Processes

Figure 2:
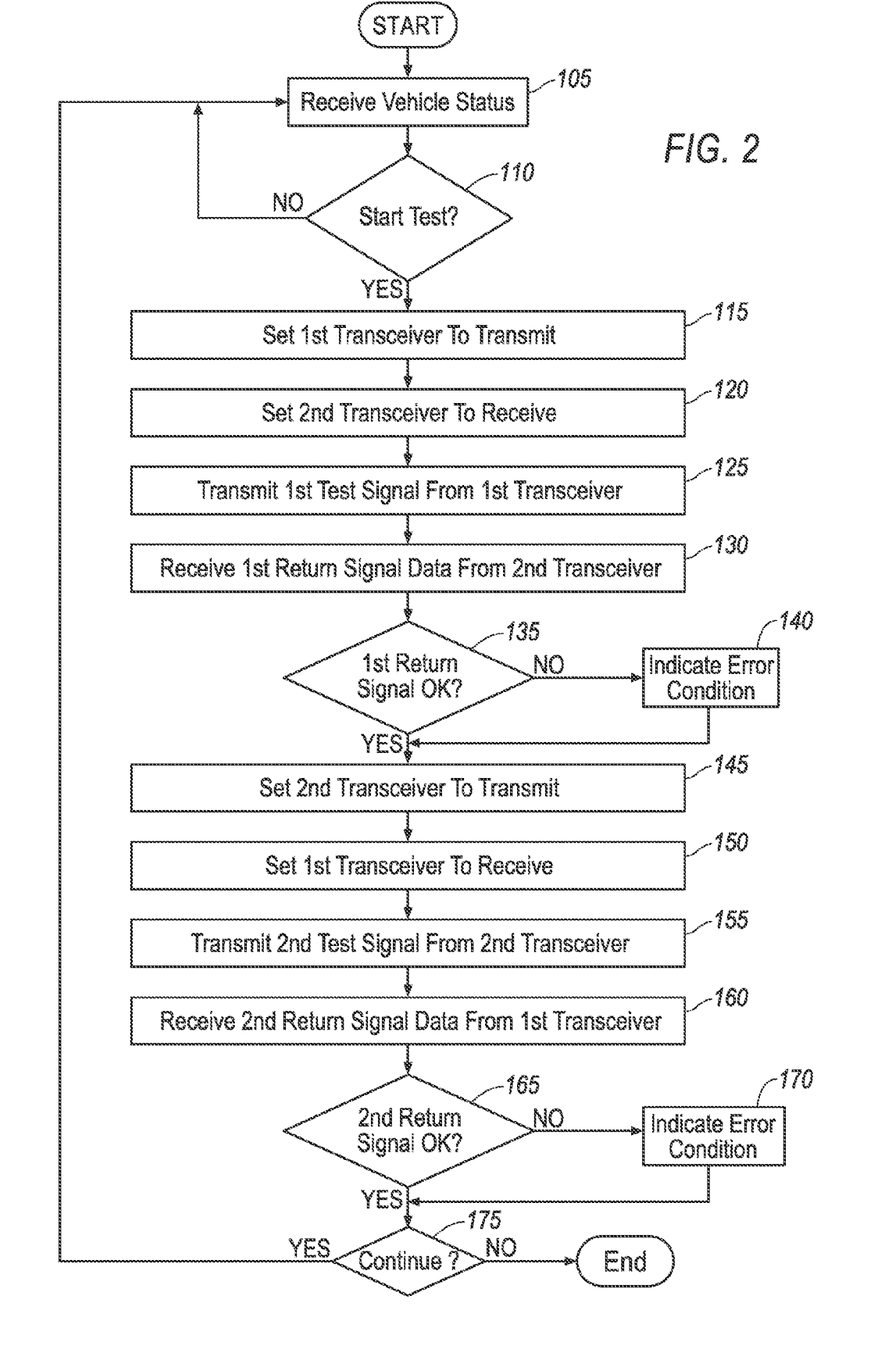
FIG. 2 is a process flow diagram for testing of a two transceiver system.

FIG. 2 is a diagram of an exemplary process 100 for executing a transceiver test of process 100 of the transceivers 25a, 25b. The process 100 begins in a block 105, wherein the control unit 15 receives operational status information such as mentioned above regarding vehicle 11 from the in-vehicle computer 20. The control unit 15, may, for example, receive the status information via the vehicle communication bus 35, which may be a CAN bus or the like. The vehicle 11 operational status may include known vehicle 11 states such as vehicle start, vehicle running, vehicle in motion, vehicle turning off, vehicle off, etc. After receiving the status information, the process 100 continues to a block 110 (or, although not shown in FIG. 2, it is to be understood that the process 100 may end, for example, if the control unit 15 and/or the vehicle 11 are powered off).

In the block 110, the control unit 15, based on the status information received from the in-vehicle computer 20 and other factors, determines whether one or more conditions are satisfied for initiating the transceiver test of process 100. For example, the control unit 15 may be programmed to initiate the transceiver test of process 100 upon receiving status information that the vehicle 11 is starting. When the control unit 15 receives information indicating to start the test, the process 100 continues in a block 115.

As another example, the control unit 15 may be programmed to initiate the transceiver test of process 100 regularly, for example every 30 minutes, while the vehicle 11 is running. In this case, when the control unit 15 receives the status information that the vehicle is running, the control unit 15 may determine the elapsed time since the last the transceiver test of process 100 was performed. When the control unit 15 determines that 30 minutes has elapsed since the last the transceiver test of process 100 was performed, a condition is satisfied so that process 100 continues in a block 115. The control unit 15 may also be programmed to initiate the transceiver test of process 100 based on other status information of vehicle 11.

On the other hand, if based on the status information received from the in-vehicle computer 20, the control unit 15 determines that the one or more conditions for starting the transceiver test of process 100 are not satisfied, the process 100 returns to the block 105.

In the block 115, the control unit 15 may begin the transceiver test of process 100 by setting the first transceiver 25a in the transmit mode. For example, the control unit 15 may send a command to the first transceiver 25a via the first vehicle communication bus 30. The command may include an instruction to switch from the standby mode or the receive mode to the transmit mode.

The command may further include an instruction to set the transceiver 25a to transmit at a test frequency. The test frequency may be, for example, a frequency which is in between frequency channels used for V2X transmissions. As another example, the test frequency may a side band of a frequency channel used for V2X transmissions. In this case, if the transceiver 25a typically uses the center frequency of the frequency channel used for V2X transmissions, the test signal can use an upper or lower side band of the channel.

Further, the command may include an instruction to select a test signal modulation scheme dedicated for test transmissions. For example, the first transceiver 25a may be set to utilize a test amplitude modulation scheme, a test frequency modulation scheme or a test pulse modulation scheme for test transmissions. The test signal modulation scheme may be different from a signal modulation scheme used for regular (non-test) transmissions.

After receiving the command, the transceiver 25a processor 45a may, based upon the command, set the switch 65a and/or the radio circuitry 50a to generate and transmit an RF signal at the test frequency via the antenna 40a. Once the first transceiver 25a is set to operate in the transmit mode, the process 100 continues in a block 120.

In the block 120, the control unit 15 continues the transceiver test of process 100 by setting the second transceiver 25b to the receive mode. The control unit 15 sends a command to the second receiver 25b via the first vehicle communication bus 30 to switch from the standby mode or the transmit mode to the receive mode. The command may further include an instruction to set the transceiver 25b to receive an RF signal at a test frequency corresponding to the test frequency of the first transceiver 25a, and/or modulated according to the test signal modulation scheme, as described in the block 115.

Based upon the command, the processor 45b sets the switch 65b and/or the radio circuitry 50b to receive the RF signal from the antenna 40b at the test frequency. Upon completing a configuration of the second transceiver 25b to operate in the receive mode, the process 100 continues in a block 125.

In the block 125, the control unit 15 instructs the first transceiver 25a to transmit a first RF test signal. For example, the control unit 15 sends a command to the first transceiver 25a processor 45a via the first vehicle communication bus 30. The command may specify a first predetermined strength for the transmission and a digital test code to be transmitted. The first predetermined strength could be, for example, an output power level determined based on the receive capability of the second and third transceivers 25b, 25c. The output power level for the first transceiver 25a should be set at a level that does not overload the second and third transceivers 25b, 25c in the receive mode. Since the transceivers 25 co-exist on the same vehicle 11, the transceivers 25 may be designed to receive a full output from the transmit function of another of the transceivers 25 without overloading. In this case, a highest power level may be used for the transmission.

The digital test code may be a code reserved for test transmissions. For example, the first RF test signal may include a digital test code at a beginning of the signal.

The processor 45a communicates the first predetermined strength of the transmission and/or the digital test code to the radio circuitry 50a. The radio circuitry 50a generates the first RF test signal which may include the digital test code. The radio circuitry 50a, via the output amplifier 55a and the antenna 40a, transmits the first RF test signal. The process 100 then continues in a block 130.

In the block 130, the antenna 40b connected to the second transceiver 25b receives the first RF test signal transmitted from the transceiver 25a. The antenna 40b provides a first return signal, based on the RF test signal, to the pre-amplifier 60b of the second transceiver 25b. The pre-amplifier 60b amplifies and/or filters the first return signal, and inputs a first modified return signal to the radio circuitry 50b. The radio circuitry 50b determines, based on the first modified return signal received from the pre-amplifier 50b, characteristics of the first return signal. The radio circuitry 50b outputs a signal or signals to the processor 45b representing the characteristics of the first return signal. The processor 45b sends data to the control unit 15 representing the characteristics of the first return signal.

For example, the radio circuitry 50b determines a strength of the first return signal and/or verifies the presence of the digital test code in the first return signal. The radio circuitry 50b outputs an analog signal and/or a digital signal corresponding to the determined strength of the first return signal and/or presence of the digital test code in the first return signal to the processor 45b. The processor 45b, upon receiving the analog and/or digital signal, sends data representing the determined strength of the first return signal and/or the presence of the digital test code in the first return signal to the control unit 15, via the vehicle communication bus 30. The process 100 then continues in a block 135.

In the block 135, the control unit 15 determines, based on the data representing the characteristics of the first return signal, whether a transmission path from the first transceiver 25a to the second transceiver path 25b (first transmission path) is operational.

For example the control unit 15 compares the determined strength of the first return signal with a first predetermined range. The first predetermined range could be determined empirically, by conducting tests of known good first and second transceivers 25a, 25b in a model vehicle 11 under laboratory conditions. Multiple transmissions from transceiver 25a could be made to transceiver 25b, and the strength of the first return signal measured. The first predetermined range could be established based on this measured data, allowing for expected variations due to manufacturing tolerances, weather conditions etc. The first predetermined range could, for example, be stored in the control unit 15. If the determined strength of the first return signal falls within the first predetermined range, and/or the presence of the digital test code in the first return signal is confirmed, the control unit 15 determines that the first transmission is operational. In this case, the process continues to a block 145.

However, if the determined strength of the first return signal is outside the first predetermined range and/or the presence of the digital test code in the first test signal is not confirmed, the control unit 15 determines that the first transmission path is non-operational. In this case, the process 100 continues in a block 140.

In the block 140, the control unit 15 indicates that an error condition is present in the V2X system 10. For example, the control unit 15 may send a command to the in-vehicle computer 20 to indicate that there is an error in the V2X system 10. The in-vehicle computer 20 may send an instruction to a dashboard display to display a symbol indicating that there is an error in the V2X system 10. Alternatively or additionally, the in-vehicle computer 20 may turn on an error lamp, or other indicator. The in-vehicle computer 20 may also store information about the error condition in a computer memory, such that the information is accessible by a diagnostic system. The display and/or other output and/or stored information may generally indicate that there is an error in the V2X system 10, and/or may specify that the first transmission path is non-operational.

The process 100 then continues the transceiver test of process 100 in a block 145 by reversing the roles of the first and second transceivers 25a, 25b. That is, transceiver test of process 100 tests a second transmission path from transceiver 25b to transceiver 25a.

In the block 145, the control unit 15 sets the second transceiver 25b in the transmit mode as described in block 115 with regard to the first transceiver 25a. Upon completing a configuration of the second transceiver 25b in the transmit mode, the process 100 continues in a block 150.

In the block 150, the control unit 15 continues the transceiver test of process 100 by setting the first transceiver 25a in the receive mode, as described in block 120 with regard to the second transceiver 25b. Upon setting the first transceiver 25a in the receive mode, the process 100 continues in a block 155.

In the block 155, the control unit 15 instructs the second transceiver 25b to transmit a second RF test signal at a second predetermined strength in a manner as described in block 125 with regard to the first transceiver 25a. The radio circuitry 50b, via the output amplifier 55b and the antenna 40b, transmits the second RF test signal. The process 100 then continues in a block 160.

In the block 160, the antenna 40a connected to the first transceiver 25a receive the second RF test signal. In a manner similar to that of the block 130 with regard to the antenna 40b and the second transceiver 25b, the antenna 40a provides a second return signal to the first transceiver 25a. The first transceiver 25a, based on the second return signal, sends data representing the characteristics of the second return signal to the control unit 15 via the vehicle communications bus 30. For example, the first transceiver 25a sends data representing a determined strength of the second return signal to the control unit 15 and/or the presence of the digital test code in the second return signal. The process 100 then continues in a block 165.

In the block 165, the control unit 15 determines whether, based on the data representing the characteristics of the second return signal, the second transmission path is operational. The control unit 15, for example, compares the determined strength of the second return signal with a second predetermined range. The second predetermined range could be determined in a manner as described in block 135. The second predetermined range could be stored in the control unit 15 at the time of vehicle 11 production. If the determined strength of the second return signal falls within the second predetermined range, and/or the presence of the digital test code in the second return signal is confirmed, the control unit 15 determines that the second transmission path is operational. In this case, the process continues in a block 175.

Alternatively, if the determined strength of the return signal is outside the predetermined range, and/or the presence of the digital test code in the second return signal is not confirmed, the control unit 15 determines that the second transmission path is non-operational. In this case, the process 100 continues in a block 170.

In the block 170, the control unit 15 indicates that an error condition is present in the V2X system 10 in a manner similar to that of block 140. The error condition may be displayed as a symbol in the dashboard display or via an error lamp or other indicator. The in-vehicle computer 20 may also store information about the error condition in a computer memory, such that the information is accessible by a diagnostic system. The display and/or other output and/or stored information may generally indicate that there is an error in the V2X system 10, and/or may specify that the second transmission path is non-operational. The process 100 then continues in a block 175.

In the block 175, the process 100 determines whether the process 100 should continue. For example, if the vehicle 11 is not running, then the process 100 could end. Error conditions that were stored in one or both blocks 140, 170, could be maintained, or, if applicable, transferred to non-volatile memory for future reference. Otherwise, the process 100 could continue with the block 105.

Figure 3:
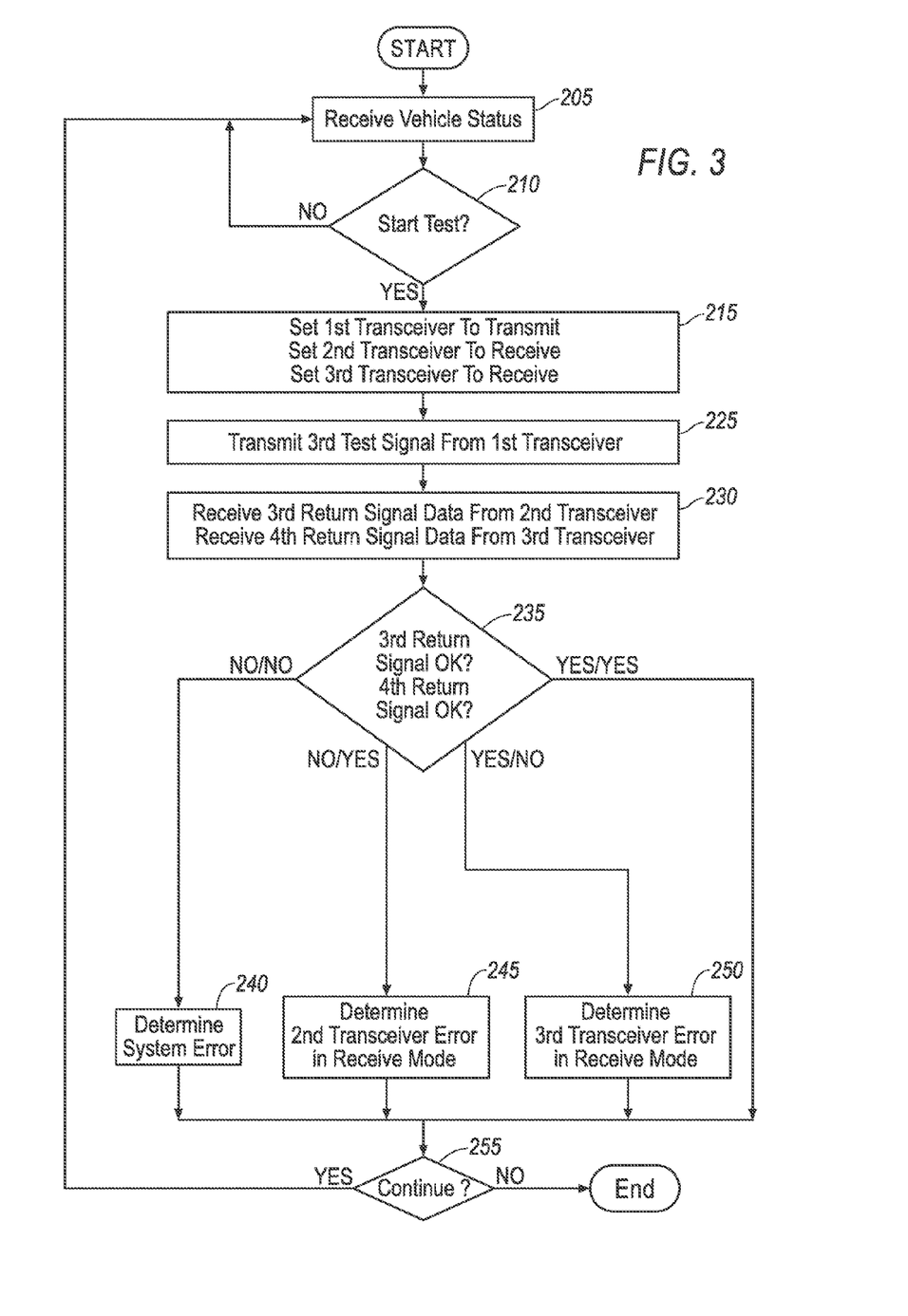
FIG. 3 is a process flow diagram for testing a receiver section within a transceiver.

FIG. 3 is a diagram of an exemplary process 200 for executing a test of the second and third transceivers 25b, 25c in the receive mode based on a transmission from the first transceiver 25a. The process 200 begins in a block 205.

In the block 205, as described above with regard to block 105, the control unit 15 receives operational status information regarding vehicle 11 from the in-vehicle computer 20. The process 200 then continues in a block 210.

In the block 210, the control unit 15, based on the status information received from the in-vehicle computer 20 and other factors, determines whether one or more conditions are satisfied for initiating the transceiver test of process 200, e.g., in a manner as described above in block 110 with regard to the process 100. When the control unit 15 determines that one or more conditions are satisfied for executing the transceiver test of process 200, the process 200 continues with a block 215.

Alternatively, in the block 210, if the control unit 15 determines that the one or more conditions for starting the transceiver test of process 200 are not satisfied, the process 200 returns to the block 205.

In the block 215, the control unit 15 continues the transceiver test of process 200 by setting the first transceiver 25a in the transmit mode and the second and third transceivers 25b, 25c in the receive mode. The first transceiver 25a may be set in the transmit mode in a manner as described above in the block 115. The second and third transceivers 25b, 25c may be set in the receive mode in a manner as described in the block 120. Then, the process 200 continues in a block 225.

In the block 225, the control unit 15 instructs the first transceiver 25a to transmit a third RF test signal at a third predetermined strength in a manner as described in the block 125. The radio circuitry 50a, via the output amplifier 55a and the antenna 40a, transmits the third RF test signal. The process 200 then continues in a block 230.

In the block 230, the antennas 40b and 40c, connected respectively to the second and third transceivers 25b, 25c, receive the third RF test signal transmitted from the first transceiver 25a. In a manner as described in block 130, the antenna 40b provides a third return signal to the second transceiver 25b, and the antenna 40c provides a fourth return signal to the third transceiver 25c. The second transceiver 25b sends data representing characteristics of the third test signal to the control unit 15. Likewise, the third transceiver 25c sends data representing characteristics of the fourth return signal to the control unit 15.

For example, data representing the third test signal may include a determined strength of the third return signal and/or the presence of the digital test code in the third test signal, and the data representing the fourth test signal may a determined strength of the fourth return signal and/or the presence of the digital test code in the fourth test signal. The process 100 then continues in a block 235.

In the block 235, the control unit 15 determines, based on the received data representing the characteristics of the third return signal whether a transmission path from the first transceiver 25a to the second transceiver 25b (third transmission path) is operational. Likewise, the control unit 15 determines, based on the data representing the fourth return signal whether a transmission path from the first transceiver 25a to the third transceiver 25c (fourth transmission path) is operational.

For example, the control unit 15 compares the determined strength of the third return signal with the third predetermined range in a manner as described in block 135.

If the determined strength of the third return signal is determined to be within the third pre-determined range and/or the presence of the digital test code in the third return is confirmed, the third transmission is determined to be operational. On the other hand, if the determined strength of the third return signal is determined to be outside the third pre-determined range and/or the presence of the digital test code in the third return signal is not confirmed, the third transmission path is determined to be non-operational.

Likewise, the control unit 15 compares the determined strength of the fourth return signal with the fourth predetermined range in a manner as described in block 135.

If the determined strength of the fourth return signal is determined to be within the fourth pre-determined range and/or the presence of the digital test code in the fourth return signal is confirmed, the fourth transmission path is determined to be operational. On the other hand, if the determined strength of the fourth return signal is determined to be outside the fourth predetermined range and/or the presence of the digital test code in the fourth return signal is not confirmed, the fourth transmission path is determined to be non-operational.

If the control unit 15 determines that both the third transmission path and the fourth transmission path are non-operational, the process 200 continues in a block 240.

If the control unit 15 determines that the third transmission path is non-operational and the fourth transmission path is operational, the process 200 continues in a block 245.

If the control unit 15 determines that the third transmission path is operational and the fourth transmission path is non-operational, the process 200 continues in a block 250.

If the control unit 15 determines that both the third and fourth transmission paths are operational, the process 200 continues in a block 255.

In the block 240, the control unit 15 indicates that an error condition is present in the V2X system in a manner as described with regard to the block 170. The error condition may also be stored as described with regard to the block 170. Then, the process 200 continues in a block 255.

In the block 245, which may follow the block 235, the control unit 15 indicates that an error condition is present in the V2X system, as described with regard to block 170. The control unit 15 could determine, if the third transmission path is non-operational, but the fourth transmission path is operational, that the error condition is related to the second transceiver 25b in the receive mode. Based on this determination, the control unit 15 may make a more detailed error indication, such that the second transceiver 25b has the error condition. The error condition may also be stored, as described with regard to the block 170. Then, the process 200 continues in a block 255.

In the block 250, which may follow the block 235, the control unit 15 indicates that an error condition is present in the V2X system as described with regard to block 170. The control unit 15 could determine, based on a result that the third transmission path is operational, but the fourth transmission path is non-operational, that the error condition is related to the third transceiver 25b in the receive mode. Based on this determination, the control unit 15 may make a more detailed error indication, such that the third transceiver 25c has the error condition. The error condition may also be stored, as described with regard to block 170. Then the process 200 continues in block 255.

In the block 255, the control unit 15 determines whether the process 200 should continue. For example, if the vehicle 11 is not running, then the process 200 could end. Error conditions that were stored in the blocks 240, 245, 250 could be maintained, or, if applicable, transferred to non-volatile memory for future reference. Otherwise, the process 200 could continue with the block 205.

Based on the transceiver test of process 200, if for example, it is determined, in block 235, that the second transceiver 25b is non-operational and the third transceiver 25c is operational, the control unit 15 could repurpose the third transceiver 25c to assume some or all of the responsibilities of the second transceiver 25b. The control unit 15 might do this in the case where critical safety functions are normally handled by the second transceiver 25b, and non-critical functions are handled by the third transceiver 25c. The control unit 15 may disable some of the non-critical functions handled by the third transceiver 25c and could repurpose the third transceiver 25c to handle the critical safety functions normally assigned to the second transceiver 25b.

Figure 4:
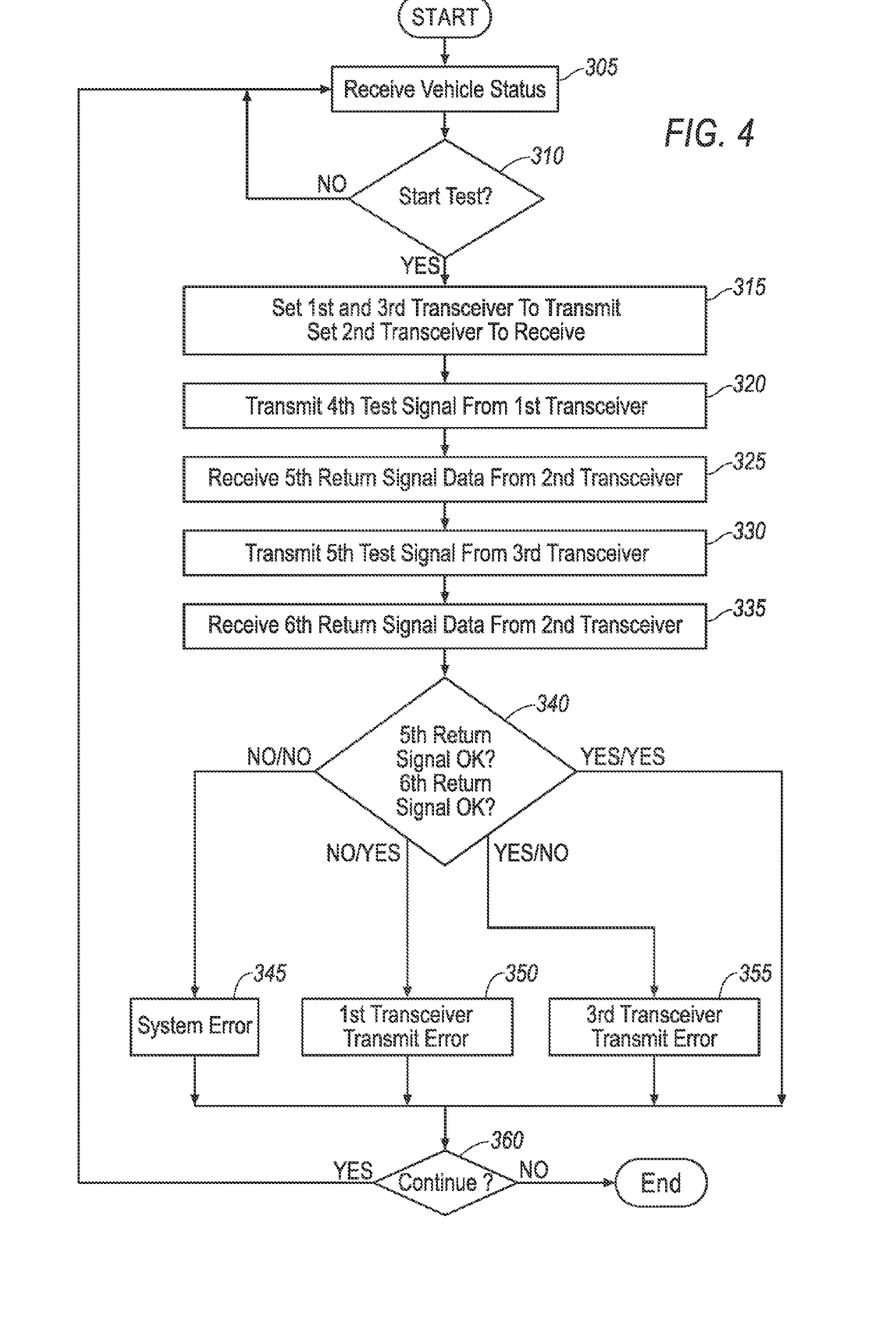
FIG. 4 is a process flow diagram for testing a transmitter section within a transceiver.

FIG. 4 is a diagram of an exemplary process 300 for executing a test of the first and third transceivers 25a in the transmit mode and the second transceiver 25b in the receive mode. The transceiver test of process 300 first tests a fifth transmission path from the first transceiver 25a to the second transceiver 25b and then tests a sixth transmission path from the third transceiver 25c to the second transceiver 25b. The process 300 begins in a block 305.

In the block 305, as described above with regard to block 105, the control unit 15 receives operational status information regarding vehicle 11 from the in-vehicle computer 20. The process 300 then continues in a block 310.

In the block 310, the control unit 15, based on the status information received from the in-vehicle computer 20 and other factors, determines whether one or more conditions are satisfied for initiating the transceiver test of process 300, as described above concerning the block 110. When the control unit 15 determines that one or more conditions are satisfied for executing the transceiver test of process 300, the process 300 continues with a block 315.

However, in the block 310, if the control unit 15 determines that the one or more conditions for starting the transceiver test of process 300 are not satisfied, the process 300 returns to the block 305.

In the block 315, the control unit 15 continues the transceiver test of process 300 by setting the first and third transceivers 25a, 25c in the transmit mode and the second transceiver 25b in the receive mode. The first and third transceivers 25a, 25c may be set in the transmit mode in a manner as described in with regard to the block 115. The second transceiver 25b may be set in the receive mode in a manner as described with regard to the block 120. Then, the process 300 continues in a block 320.

In the block 320, the control unit 15 instructs the first transceiver 25a to transmit a fourth RF test signal at a fourth predetermined strength in a manner as described in the block 125. The radio circuitry 50a, via the output amplifier 55a and the antenna 40a, transmits the fourth RF test signal. The process 300 then continues in a block 325.

In the block 325, the antenna 40b receives the fourth RF test signal transmitted from the first transceiver 25a. In a manner as described in the block 130, the antenna 40b provides a fifth return signal to the second transceiver 25b. The second transceiver 25*b* sends data representing characteristics of the fifth return signal to the control unit 15. For example, the second transceiver sends data representing a determined strength of the fifth return signal and/or the presence of the digital test code in the fifth return signal to the control unit 15. The control unit 15 may temporarily store the data representing characteristics of the fifth return signal in the control unit 15 memory for further processing in a block 340 described below. The process 300 then continues in a block 330.

In the block 330, the control unit 15 instructs the third transceiver 25*c* to transmit a fifth RF test signal at a fifth predetermined strength in a manner as described in the block 125. The radio circuitry 50*c*, via the output amplifier 55*c* and the antenna 40*c*, transmits the fifth RF test signal. The process 300 then continues in a block 335.

In the block 335, the antenna 40*b* receives the fifth RF test signal transmitted from the first transceiver 25*a*. In a manner as described in the block 130, the antenna 40*b* provides a sixth return signal to the second transceiver 25*b*. The second transceiver 25*b* sends data representing characteristics of the sixth return signal to the control unit 15. For example, the second transceiver 25*b* sends data representing a determined strength of the sixth return signal and/or the presence of the digital test code in the sixth return signal to the control unit 15. The control unit 15 may temporarily store the data representing the characteristics of the sixth return signal in the control unit 15 memory for further processing in the blocks 345, 350 described below. The process 300 then continues in a block 340.

In the block 340, the control unit 15 determines, based on the received data representing the characteristics of the fifth return signal whether the fifth transmission path is operational. Likewise, the control unit 15 determines, based on the data representing the sixth return signal whether the sixth transmission is operational.

For example, if the determined strength of the fifth return signal is determined to be within the fifth pre-determined range and/or the presence of the digital test code in the fifth return signal is confirmed, the fifth transmission path is determined to be operational. On the other hand, if the determined strength of the fifth return signal is determined to be outside the fifth predetermined range and/or the presence of the digital test code in the fifth return signal is not confirmed, the fifth transmission path is determined to be non-operational.

Likewise, if the determined strength of the sixth return signal is determined to be within the sixth pre-determined range and/or the presence of the digital test code in the sixth return signal is confirmed, the sixth transmission path is determined to be operational. On the other hand, if the determined strength of the sixth return signal is determined to be outside the fifth predetermined range and/or the presence of the digital test code in the sixth return signal is not confirmed, the sixth transmission path is determined to be non-operational.

If the control unit 15 determines that both the fifth and sixth transmission paths are non-operational, the process 200 continues in a block 345.

If the control unit 15 determines the fifth transmission path is non-operational and the sixth transmission path is operational, the process 200 continues in a block 350.

If the control unit 15 determines the fifth transmission path is operational and the sixth transmission path is non-operational, the process 200 continues in a block 355.

If the control unit 15 determines that both the fifth and sixth transmission paths are operational, the process 200 continues in a block 360.

In the block 345, the control unit 15 indicates that an error condition is present in the V2X system as described with regard to block 170. The error condition may also be stored as described with regard to the block 170. Then, the process 300 continues in a block 360.

In the block 350, which may follow the block 340, the control unit 15 indicates that an error condition is present in the V2X system, as described in the block 170. The control unit 15 could determine, if the fifth transmission path is non-operational, but the sixth transmission path is operational, that, for example, the error condition is related to the first transceiver 25*a* in the transmit mode, and make a more detailed error indication. The error condition may also be stored, in a manner as described in the block 170. Then, the process 300 continues in the block 360.

In the block 355, which may follow the block 340, the control unit 15 indicates that an error condition is present in the V2X system in a manner as described in the block 170. The control unit 15 could determine, based on a result that the sixth transmission path is non-operational, but the fifth transmission path is operational, that, for example, the error condition is related to the third transceiver 25*c* in the transmit mode. Based on this determination, the control unit 15 may make a more detailed error indication, such that the second transceiver 25*b* has the error condition. The error condition may also be stored in computer memory, as described with regard to the block 170. Then the process 300 continues in block 360.

In the block 370, which may follow the block 340, the control unit 15 determines whether the process 300 should continue. For example, if the vehicle 11 is not running, then the process 300 could end. Error conditions that were stored in the blocks 345, 350, 355 could be maintained, or, if applicable, transferred to non-volatile memory for future reference. Otherwise, the process 300 could continue with the block 305.

Based on the transceiver test of process 300, if for example, it is determined in block 340, that the first transceiver 25*a* is non-operational and the third transceiver 25*c* is operational, the control unit 15 could repurpose the third transceiver 25*c* to assume some or all of the responsibilities of the first transceiver 25*a*. The control unit 15 might do this in the case where critical safety functions are normally handled by the first transceiver 25*a*, and non-critical functions are handled by the third transceiver 25*c*. The control unit 15 may disable some of the non-critical functions handled by the third transceiver 25*c* and could repurpose the third transceiver 25*c* to handle the critical safety functions normally assigned to first transceiver 25*a*.

According to the test described above, the presence of the digital test code within a return signal is confirmed within the transceiver 25 receiving the return signal. Other methods are possible. For example, the transceiver 25 that receives the return signal could extract the digital content of the return signal, and send a digital message including the digital content of the return signal to the control unit 15. The control unit 15 could determine, based on the digital message, whether the digital test code was present in the return signal.

The tests described above may be used with other combinations of transceivers 25. For example, the transceiver test of process 100 for testing transmission paths between the first and second transceivers 25*a*, 25*b*, may also be used with the second and third transceivers 25*b*, 25*c*. As another example, the transceiver test of process 200 wherein the first transceiver 25*a* transmits to the second and third transceivers 25*b*, 25*c*, may be modified such that the second transceiver 25*b* transmits to the first and third transceivers 25*a*, 25*c*. Further, for vehicles with more than three transceivers, the tests described above could be expanded to include additional transceivers.

Tests similar to the test described above in process 200 may be executed by incorporating external V2X transmitters. For example, the vehicle 11 may be equipped with a GPS (global positioning system). Based on the GPS, a vehicle 11 computer could determine the vehicle 11 is in proximity to a known external V2X transmitter. The in-vehicle computer 20 could communicate the proximity information to the control unit 15. The control unit 15 could switch each of the transceivers 25a and 25b into the receive mode in a manner as described in the block 215 of process 200. The control unit 15 could receive information from of the first and second transceivers 25a, 25b regarding the strength of a respective first and second received signal from the external V2X transmitter, in a manner as described in block 230.

Based on the relative location of the external V2X transmitter, and other information, i.e., the type of transceiver, the strength of the transmission from transceiver, etc., the control unit 15 could determine expected ranges for the strength of the first and second received signal. In a manner similar to process 200, blocks 235 through 245, the control unit could determine which, if either, of the first and second transceivers 25a, 25b is non-operational in the receive mode.

Similarly, the vehicle 11 may, through V2V communications, identify that another vehicle in proximity to the vehicle 11 is transmitting RF signals via a transceiver of the other vehicle. The communications may include, for example, the type of transceiver and the location of the other vehicle. Based on this information, the control unit 15 may conduct a test to determine which, if either of a first and second transceiver 25a, 25b is non-operational, similar to the test described with the external V2X transmitter.

In the drawings, the same reference numbers indicate the same elements. Further, some or all of these elements could be changed. Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

The invention claimed is:

1. A system comprising:
   a control unit included in a vehicle including a processor and a memory;
   a first radio frequency transceiver included in the vehicle and communicatively coupled to a vehicle communication bus included in the vehicle,
   a first antenna connected to the first transceiver;
   a second radio frequency transceiver included in the vehicle and communicatively coupled to the vehicle communication bus; and
   a second antenna connected to the second transceiver;
   wherein the control unit is programmed to:
      provide a command via the vehicle communications bus to set the first transceiver in a transmit mode and set the second transceiver in a receive mode;
      instruct the first transceiver to transmit a first test signal at a first predetermined strength via the first antenna; and
      receive data representing at least one characteristic of a first return signal from the second transceiver based upon the first test signal received by the second antenna.

2. The system of claim 1, wherein the control unit is further programmed to:
   provide a command via the communications bus to set the second transceiver in the transmit mode and set the first transceiver in the receive mode;
   instruct the second transceiver to transmit a second test signal at a second predetermined strength via the second antenna; and
   receive data representing at least one characteristic of a second return signal from the first transceiver based upon the second test signal received by the first antenna.

3. The system of claim 2, wherein the control unit is further programmed to determine an operational status of a transmission path from the second transceiver to the first transceiver at least in part based on the at least one characteristic of the second return signal.

4. The system of claim 3, wherein the at least one characteristic of the second return signal includes a second confirmation status of a digital test code within the second return signal, and the control unit determines the operation status of the transmission path from the second transceiver to the first transceiver at least in part based on the second confirmation status.

5. The system of claim 2, wherein:
   the at least one characteristic of the second return signal includes a strength of the second return signal, and
   the control unit is further programmed to determine if the strength of the second return signal is within a second predetermined range.

6. The system of claim 5, wherein the control unit is further programmed to provide an indication that the strength of the second return signal is outside the second predetermined range.

7. The system of claim 1, wherein the control unit is further programmed to determine an operational status of a transmission path from the first transceiver to the second transceiver at least in part based on the at least one characteristic of the first return signal.

8. The system of claim 7, wherein the at least one characteristic of the first return signal includes a first confirmation status of a digital test code within the first return signal, and the control unit determines the operational status of the transmission path from the first transceiver to the second transceiver at least in part based on the first confirmation status.

9. The system of claim 1, wherein:
   the at least one characteristic of the first return signal includes a strength of the first return signal, and
   the control unit is further programmed to determine if the strength of the first return signal is within a first predetermined range.

10. The system of claim 9, wherein the control unit is further programmed to provide an indication that the strength of the first return signal is outside the first predetermined range.

11. The system of claim 1, wherein the control unit is further programmed to:
   receive status information from the vehicle;
   determine based at least in part on the status information that a condition to start testing of the first and second transceivers is satisfied; and
   execute testing of the first and second transceivers.

12. The system of claim 11, wherein the status information includes at least one of the following: vehicle running, vehicle not running, vehicle starting, and vehicle stopping.

13. The system of claim 1, wherein the control unit is further programmed to:
determine that the data represents at least one characteristic outside of a predetermined range; and
repurpose one of the first and second transceivers to assume at least some of the communications of the other one of the first and second transceivers, based at least in part on the determination that at least one characteristic represented by the data is outside of the predetermined range.

14. The system of claim 13, wherein the predetermined range is based at least in part on a type of vehicle.

15. The system of claim 14, wherein the predetermined range is determined empirically for the type of vehicle.

16. A system comprising:
a control unit included in a vehicle including a processor and a memory;
a first radio frequency transceiver included in the vehicle communicatively coupled to a vehicle communication bus included in the vehicle;
a first antenna connected to the first transceiver;
a second radio frequency transceiver included in the vehicle communicatively coupled to the vehicle communication bus;
a second antenna connected to the second transceiver;
a third transceiver included in the vehicle communicatively coupled to the vehicle communication bus; and
a third antenna connected to the third transceiver;
wherein the control unit is programmed to:
provide a command to set the first transceiver in a transmit mode, set the second transceiver in a receive mode and set the third transceiver in the receive mode;
instruct the first transceiver to transmit a third test signal at a third predetermined strength via the third antenna;
receive data representing a strength of a third return signal from the second transceiver based upon the third test signal received by the second antenna;
determine if the strength of the third return signal is within a third predetermined range;
receive data representing a strength of a fourth return signal from the third transceiver based upon the third test signal received by the third antenna; and
determine if the strength of the fourth return signal is within a fourth predetermined range.

17. The system of claim 16, wherein:
the second transceiver is responsible for critical functions of a vehicle;
the third transceiver is responsible for non-critical functions of the vehicle; and
the control unit is programmed to repurpose the third transceiver to perform at least one of the critical functions for which the second transceiver is responsible based at least in part upon a determination that the strength of the third return signal is not within the third predetermined range and the strength of the fourth return signal is within the fourth predetermined range.

18. The system of claim 16, wherein the control unit is further programmed to:
provide a command via the communications bus to set the first transceiver in the transmit mode, set the second transceiver in the receive mode and set the third transceiver in the transmit mode;
instruct the first transceiver to transmit a fourth test signal at a fourth predetermined strength via the first antenna;
receive data representing a strength of a fifth return signal from the second transceiver based upon the fourth test signal received by the second antenna;
determine if the strength of the fifth return signal is within a fifth predetermined range;
instruct the third transceiver to transmit a fifth test signal at a fifth predetermined strength via the third antenna;
receive data representing a strength of a sixth return signal from the second transceiver based upon fifth test signal received by the second antenna; and
determine if the strength of the sixth return signal is within a sixth predetermined range.

19. The system of claim 18, wherein:
the first transceiver is responsible for critical functions of a vehicle;
the third transceiver is responsible for non-critical functions of the vehicle; and
the control unit is programmed to repurpose the third transceiver to perform at least one of the critical functions for which the second transceiver is responsible based at least in part upon a determination that the strength of the fifth return signal is not within the fifth predetermined range and the strength of the sixth return signal is within the sixth predetermined range.

20. A method, carried out according to instructions stored in a non-transitory read memory of a control unit in a vehicle comprising:
setting, via a vehicle communications bus in the vehicle, a first in-vehicle radio frequency transceiver included in the vehicle and connected to a first in-vehicle antenna in a transmit mode;
setting, via the vehicle communications bus in the vehicle, a second in-vehicle radio frequency transceiver included in the vehicle and connected to a second in-vehicle antenna in a receive mode;
instructing the first transceiver to transmit, via the first antenna, a first test signal at a first predetermined strength;
receiving data representing a strength of a first return signal from the second transceiver based on the first test signal received by the second antenna; and
determining if the strength of the first return signal is within a first predetermined range.

* * * * *